US009137828B2

(12) United States Patent
Meyer et al.

(10) Patent No.: US 9,137,828 B2
(45) Date of Patent: *Sep. 15, 2015

(54) METHODS AND APPARATUSES FOR PERFORMING RANDOM ACCESS IN A TELECOMMUNICATIONS SYSTEM

(71) Applicant: TELEFONAKTIEBOLAGET L M ERICSSON (PUBL), Stockholm (SE)

(72) Inventors: Michael Meyer, Aachen (DE); Magnus Stattin, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/107,604

(22) Filed: Dec. 16, 2013

(65) Prior Publication Data

US 2014/0247776 A1  Sep. 4, 2014

Related U.S. Application Data

(63) Continuation of application No. 13/550,104, filed on Jul. 16, 2012, now Pat. No. 8,611,369, and a continuation of application No. 12/473,582, filed on May 28, 2009, now Pat. No. 8,223,791, and a continuation of application No. PCT/SE2008/051452, filed on Dec. 15, 2008.

(60) Provisional application No. 61/073,808, filed on Jun. 19, 2008.

(51) Int. Cl.
*H04W 4/00* (2009.01)
*H04W 74/08* (2009.01)
*H04W 74/00* (2009.01)

(52) U.S. Cl.
CPC ........ *H04W 74/0833* (2013.01); *H04W 74/002* (2013.01)

(58) Field of Classification Search
None
See application file for complete search history.

(56) References Cited

U.S. PATENT DOCUMENTS

| 8,223,791 | B2 | 7/2012 | Meyer et al. |
| 8,611,262 | B2 | 12/2013 | Baldemair |
| 8,611,369 | B2 * | 12/2013 | Meyer et al. ............ 370/462 |
| 8,811,311 | B2 * | 8/2014 | Huang et al. ............ 370/329 |

(Continued)

FOREIGN PATENT DOCUMENTS

WO  2008/053653 A1  5/2008

OTHER PUBLICATIONS

3rd Generation Partnership Project; Technical Specification Group Radio Access Network. 3GPP TS 36.321 v8.0.0. (Dec. 2007).
Universal Mobile Telecommunications System (UTMS); Evolved Universal Terrestrial Radio Access Network (E-UTRAN). 3GPP TS 36.300 v8.2.0 (Oct. 2007).
Nokia Siemens Networks, et al: "PDCCH format for allocation of dedicated preambles". 3GPP TSG-RAN WG1 Meeting #53. R1-081839. May 5-9, 2008, Kansas City, USA.

(Continued)

*Primary Examiner* — Anh-Vu Ly

(57) ABSTRACT

A method of enabling a user equipment to perform a contention based random access, includes maintaining a set of non-dedicated random access preambles for contention-free random access and a set dedicated random access preambles for contention-based random access. The method also includes determining a random access preamble identifier and transmitting a message to the user equipment containing the determined random access preamble identifier. Additionally, the method includes receiving from the user equipment a non-dedicated random access preamble that is selected by the user equipment based on the random access preamble identifier comprised in the transmitted message.

32 Claims, 5 Drawing Sheets

(56) References Cited

U.S. PATENT DOCUMENTS

| | | |
|---|---|---|
| 8,923,867 B2 | 12/2014 | Kato |
| 2005/0047429 A1 | 3/2005 | Koo et al. |
| 2005/0053029 A1 | 3/2005 | Lee et al. |
| 2007/0206531 A1 | 9/2007 | Pajukoski et al. |
| 2008/0268849 A1* | 10/2008 | Narasimha et al. ........... 455/437 |
| 2008/0268850 A1* | 10/2008 | Narasimha et al. ........... 455/437 |
| 2009/0215459 A1 | 8/2009 | Kuo |
| 2010/0074202 A1 | 3/2010 | Park |
| 2010/0093386 A1 | 4/2010 | Damnjanovic et al. |
| 2010/0195636 A1* | 8/2010 | Nakashima et al. ........... 370/342 |
| 2010/0197308 A1* | 8/2010 | Racz et al. .................... 455/436 |
| 2010/0216483 A1* | 8/2010 | Tynderfeldt et al. .......... 455/450 |
| 2011/0096748 A1 | 4/2011 | Meyer |
| 2011/0134862 A1* | 6/2011 | Huang et al. .................. 370/329 |
| 2011/0165874 A1* | 7/2011 | Amirijoo et al. .............. 455/434 |
| 2011/0176513 A1 | 7/2011 | Yi et al. |
| 2013/0301591 A1* | 11/2013 | Meyer et al. .................. 370/329 |
| 2014/0146790 A1* | 5/2014 | Zhang et al. .................. 370/331 |
| 2014/0219257 A1 | 8/2014 | Parkvall |

OTHER PUBLICATIONS

"Overload handling for Non-Contention based RACH," 3GPP TSG-RAN WG2#61. R2-080751. Feb. 11-15, 2008. Sorrento, Italy.

3rd Generation Partnership Project, Technical Specification Group Radio Access Network; Evolved Universal Terrestrial Radio Access (E-UTRA) and Evolved Universal Terrestrial Radio Access Network (E-UTRAN); Overall description; Stage 2 (Release 8). 3GPP TS 36.300 v8.4.0 (Mar. 2008).

3rd Generation Partnership Project, Technical Specification Group Radio Access Network; Evolved Universal Terrestrial Radio Access (E-UTRA) Medium Access Control (MAC) protocol specification (Release 8) 3GPP TS 36.321 v.8.2.0 (May 2008).

Nokia Siemens Networks, Nokia: 3GPP TSG-RAN WG2 Meeting #58, R2-071726, "Non-Contention based methods in HO," Kobe, Japan, May 7-11, 2007,.

Ericsson: 3GPP TSG-RAN WG2 #56, R2-063225, "RACH Partitioning for Handover," Riga, Latvia, Nov. 6-10, 2006.

* cited by examiner

METHODS AND APPARATUSES FOR PERFORMING RANDOM ACCESS IN A TELECOMMUNICATIONS SYSTEM

CROSS-REFERENCE TO RELATED APPLICATIONS

This application is a continuation of U.S. patent application Ser. No. 13/550,104, filed Jul. 16, 2012, which is a continuation of International Application No. PCT/SE2008/051452 with an international filing date of Dec. 15, 2008, which corresponds to the national-stage entry U.S. patent application Ser. No. 12/473,582, filed May 28, 2009 and which claims the benefit of U.S. Provisional Application No. 61/073,808 filed on Jun. 19, 2008, and the contents of all of the preceding are incorporated herein by reference in herein.

BACKGROUND

The present invention relates generally to the field of wireless telecommunications, and, more particularly, to methods and apparatuses for random access in a telecommunications system using a preamble.

The 3rd Generation Partnership Project (3GPP) is responsible for the standardization of the UMTS (Universal Mobile Telecommunication Service) system, and LTE (Long term Evolution) is now under discussion as a next generation mobile communication system of the UMTS system. LTE is a technology for realizing high-speed packet-based communication that can reach data rates of more than 100 Mbps on the downlink and of more than 50 Mbps on the uplink.

Generally, one or more cells are allocated to a radio base station, known in the 3GPP LTE system as eNB (enhanced/evolved NodeB) or eNodeB. In addition, eNBs in LTE will interact directly with the core network and with other eNBs. A plurality of user equipments can be placed in a cell served by an eNB. A user equipment (UE) can be represented by a mobile phone, a wireless terminal, a laptop, a personal computer, a personal digital assistant, a voice over internet protocol (VoIP) capable phone or any other 3GPP LTE capable UE. Generally, a UE's first access to the system is performed by means of a random access (RA) procedure. The objectives of the RA procedure may include: initial access; handover; scheduling request (request for radio resources); timing synchronization, and the like. The radio network nodes generally control the behavior of the UE. As an example, uplink transmission parameters like frequency, timing and power are regulated via downlink control signalling from the radio base station (e.g. eNB) to the UE. For the uplink (UL) frequency and power estimate parameters, a UE can derive those parameters from one or several downlink (control) signals. However, making a timing estimate for the uplink is more difficult due to that the propagation delay between the eNB (or eNodeB) and the UE is generally unknown. As an example, when a UE is powered on or turned on or after a long standby time, the UE is not synchronized in the uplink. Therefore, before commencing traffic, the UE has to access the network, which in a first step includes obtaining synchronization to the network. This is usually done by the UE which performs measurement(s) by listening to downlink signals and obtain from these signals timing synchronization; an estimate of a frequency error, and also an estimate of the downlink pathloss. Even though the UE is now time-synchronized to the downlink, signals to be sent from the UE are still not aligned with the reception timing at the eNB (or eNodeB) due to said unknown propagation delay. Thus the UE has to carry out a random access (RA) procedure to the network. The RA procedure is a procedure typically used by the UE to request access to a system or resources when the UE discovers a need to acquire uplink synchronization or a need to make an uplink transmission and no resources for said uplink transmissions are yet available to the UE. Furthermore, synchronization or time alignment of uplink transmissions aims to minimize interference with transmissions of other UEs and increase resource efficiency by minimizing the need for guard bands.

The RA procedure can be classified into a contention-based random access procedure and a contention-free (or non-contention-based) random access procedure.

For the contention-based random access procedure, a first set forming a pool of non-dedicated random access preambles are assigned per cell (i.e. to a eNodeB). This pool is primarily used when there is UE-originated data and the UE has to establish a connection and an adequate uplink timing relation with the network through the RA procedure. When performing contention-based random access, the UE arbitrarily selects a preamble from the pool as the non-dedicated random access preamble. This is known as UE initiated random access (supported in LTE). Thus for contention-based random access, the network (or the eNB) is not (immediately) aware of which UE selected which preamble. A drawback with this is that multiple UEs may in fact select the same preamble and they may attempt to access the network (or eNodeB) at the same time. This may cause collision(s) to occur. Thus, an extra step of identifying UEs trying to access the network (or eNodeB) and resolving potential collisions, a so-called contention resolution mechanism, is needed.

For performing contention-free random access, there is also defined a second set forming a pool of random access preambles assigned per cell (i.e. to a eNodeB). These preambles are known as dedicated random access preambles. Contrary to the non-dedicated random access preambles, a dedicated random access preamble is assigned to the UE by the eNodeB. In other words, this preamble cannot be autonomously selected by the UE and therefore, for the duration of the validity of the assignment, this dedicated random access preamble is exclusively dedicated to the UE. This is known as network triggered or network ordered random access (supported in LTE). Since a specific preamble is assigned/dedicated to the UE, it is a benefit of contention-free access that the eNodeB can immediately know from the received preamble, which UE tries (or tried) to access the network. This thus eliminates the need for contention resolution and therefore improves resource efficiency by minimizing the risk of collisions. Furthermore, avoiding the contention resolution procedure reduces the delay.

It should be noted that the network triggered random access described above, can be used to force a UE, which does not have a valid uplink timing to synchronize its uplink to the timing at the eNodeB, e.g., prior to the eNodeB making a downlink transmission for which the UE will need to transmit an acknowledgment (ACK) or a negative-acknowledgment (or a non-acknowledgment) (NACK) feedback. It should also be mentioned that because of the non-zero duration of the random access and uplink synchronization procedure, the re-synchronization is typically forced in advance of making the downlink transmission. If e.g. downlink data arrives at the UE, synchronization needs to be re-established first, and for this purpose, the above described dedicated random access preamble is assigned to the UE, which the UE can use to perform a contention-free random access procedure. This will trigger a timing advance adjustment command from the eNB, and based on this command, the UE can re-establish time-alignment.

Since the random access procedure is the first procedure performed by the UE to access the network, it is important that random access works as it should. If random access fails, the UE cannot access the network. An exemplary scenario where a random access procedure can fail or cannot be established is when all of the preambles (dedicated) are already in use. As mentioned before, the eNodeB keeps track of the dedicated preambles it has already allocated/assigned, and when there is no such dedicated preamble available for allocation, the eNB has to advice the UE on how to proceed. Thus, in the exemplary case where none of the dedicated random access preambles is available for allocation, the UE cannot be instructed to perform a random access required to resume or conduct data transmissions. This will lead to delay in random access by the UE until e.g. a dedicated preamble becomes available, thus leading to unnecessary increase in data latency which is undesirable in a network.

SUMMARY

It is thus an object of the exemplary embodiments of the present invention to address the above mentioned problems and to provide methods and apparatuses for enabling a UE to perform a successful contention-based random access procedure.

According to a first aspect of embodiments of the present invention, the above stated problem is solved by means of a method in a radio base station; to enable a user equipment to perform a contention based random access. The radio base station representing a eNB or a eNodeB or a NodeB, is assigned a first set of non-dedicated random access preambles and a second set of dedicated random access preambles. According to embodiments of the present invention, the radio base station determines a random access preamble identifier (RAPID); transmits a message to the UE containing the determined RAPID; and receives from the UE a non-dedicated random access preamble that is selected by the user equipment based on the RAPID comprised in the transmitted message.

Thus, when, for example, none of the dedicated random access preambles is available for allocation, a RAPID is determined by the radio base station which signals it in a message to the UE and the UE selects based on the received RAPID a non-dedicated preamble to perform contention-based random access to the system instead of contention-free random access.

According to a second aspect of embodiments of the present invention, the above stated problem is solved by means of a method in a UE for performing a contention-based random access in a telecommunications system comprising a radio base station. A first set of non-dedicated random access preambles and a second set of dedicated random access preambles are assigned to the radio base station. The user equipment receives a message from the radio base station containing a RAPID, determines that the RAPID belongs to the first set of non-dedicated random access preambles, selects a non-dedicated random access preamble from the first set based on the received RAPID; and transmits the selected non-dedicated random access preamble to the radio base station to perform a contention-based random access.

According to a third aspect of embodiments of the present invention, the above stated problem is solved by means of a radio base station for enabling a UE to perform a contention-based random access. As mentioned above, a first set of non-dedicated random access preambles and a second set of dedicated random access preambles are assigned to the radio base station. The radio base station, according to embodiments of the present invention is configured to determine a RAPID; to transmit a message containing the determined RAPID to the UE, and to receive from the UE a non-dedicated random access preamble that is selected by the UE based on the RAPID.

According to a fourth aspect of embodiments of the present invention, the above stated problem is solved by means of a UE for performing a contention-based random access in a telecommunications system comprising a radio base station. The radio base station is assigned a first set of non-dedicated random access preambles and a second set of dedicated random access preambles. According to embodiments of the present invention, the UE is configured to receive a message containing a RAPID from the radio base station, to determine whether the received RAPID belongs to the first set, to select a non-dedicated random access preamble from the first set based on the RAPID received in the message, and to transmit the selected non-dedicated random access preamble to the radio base station.

According to a fifth aspect of embodiments of the present invention, the above stated problem is solved by means of a method in a telecommunications system, of enabling a UE to perform a contention-based random access, the system comprising a radio base station being assigned a first set of non-dedicated random access preambles and a second set of dedicated random access preambles. The method comprises determining in the radio base station a RAPID; transmitting the RAPID from the radio base station to the UE, receiving at the UE the message from the radio base station, determining at said UE that the received RAPID belongs to the first set; selecting in the UE a non-dedicated random access preamble from the first set based on the received RAPID; transmitting the selected non-dedicated preamble by the UE, and receiving the selected non-dedicated preamble by the radio base station.

According to a sixth aspect of embodiments of the present invention, the above stated problem is solved by means of a telecommunications system for enabling a UE to perform a contention based random access. The system comprises a radio base station being assigned a first set of non-dedicated random access preambles and a second set of dedicated random access preambles. In the system, the radio base station is configured to determine a RAPID, to transmit the RAPID to the user equipment, and to subsequently receive the non-dedicated preamble transmitted by the user equipment. The user equipment is configured to receive the message containing the RAPID from the radio base station, to determine that the received RAPID belongs to the first set, and to select a non-dedicated random access preamble from the first set based on the received RAPID.

An advantage with the present invention is that a random access procedure is performed by a UE even though e.g. none of the dedicated random access preamble of the second set is available for allocation to the UE.

Another advantage with the present invention is that data latency due to lack of e.g. dedicated random access preambles is reduced or even eliminated.

Yet another advantage with the present invention is that existing signaling formats are re-used and no special message format is needed to achieve a random access procedure in accordance with embodiments of the present invention.

Still other objects and features of the present invention will become apparent from the following detailed description in conjunction with the accompanying drawings, attention to be called to the fact, however, that the following drawings are illustrative only, and that various modifications and changes may be made in the specific embodiments illustrated as described within the scope of the appended claims. It should further be understood that the drawings are not necessarily drawn to scale and that, unless otherwise indicated, they are merely intended to conceptually illustrate the structures and procedures described herein.

DETAILED DESCRIPTION

In the following description, for purposes of explanation and not limitation, specific details are set forth such as particular architectures, scenarios, techniques, etc. in order to provide thorough understanding of the present invention. However, it will be apparent to the person skilled in the art that the present invention and its embodiments may be practiced in other embodiments that depart from these specific details.

The different embodiments of the present invention are described herein by way of reference to particular example scenarios. In particular, the invention is described in a non-limiting general context in relation to random access procedures in a telecommunications network system that is based on the third generation (3G) long term evolution (LTE) concept. It should be noted that the present invention is not restricted to 3G LTE but can be applicable in other wireless systems that employ random access procedures, such as WiMAX (worldwide interoperability for microwave access), or HSPA (high speed packet access) or HSUPA (high speed uplink packet access) or HSDPA (high speed downlink packet access) or WCDMA (wideband code division multiple access) etc.

Figure 1:
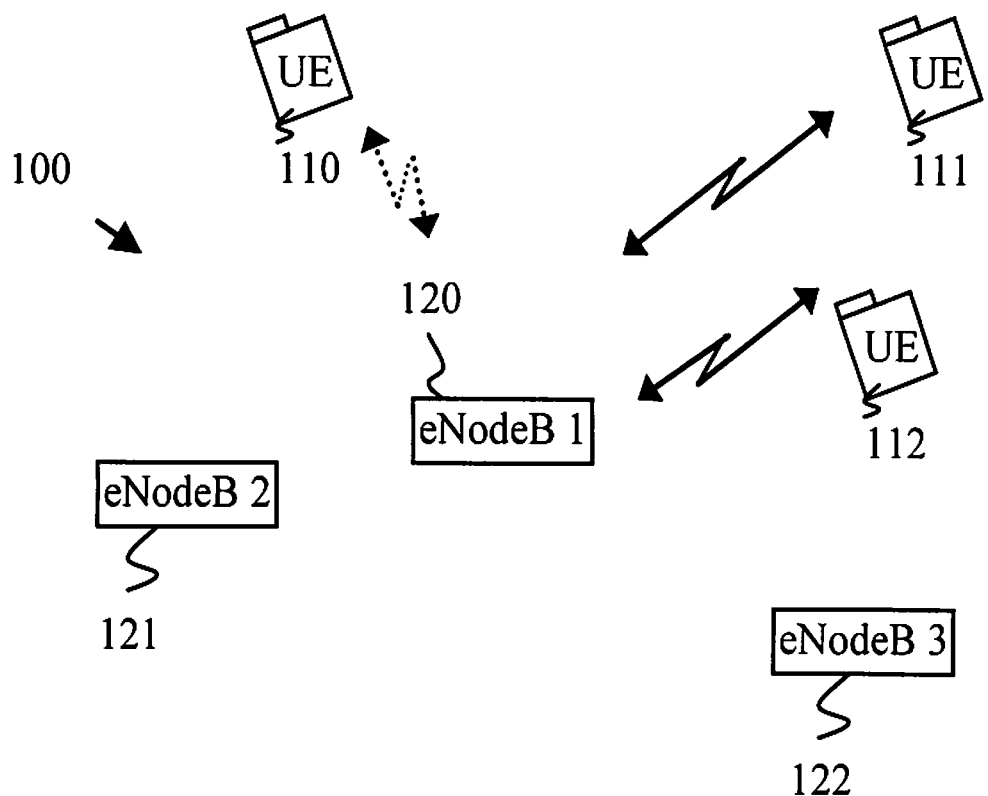
FIG. 1 is a diagram illustrating an example of a wireless network telecommunications system wherein exemplary embodiments of the present invention can be applied.

Referring to FIG. 1, there is illustrated a block diagram of an exemplary wireless telecommunications network system 100 in which the different exemplary embodiment of the present invention may be applied. Note that the system depicted in FIG. 1 only shows transceivers or nodes that are necessary for understanding the different exemplary embodiments of the present invention. As shown, the system 100 which is here considered to represent a simplified 3GPP LTE system, comprises a number of user equipments UE 110, UE 111, UE 112, and apparatuses acting as radio base stations and denoted eNodeB 1 120, eNodeB 2, 121 and eNodeB 3 122. One of the functions of the eNodeBs is to control traffic to and from UEs in a cell. A UE is suitable to be used as a mobile phone, a wireless terminal, a laptop, a personal computer, a personal digital assistant, a voice over internet protocol (VoIP) capable phone or any other 3GPP LTE capable equipment. Traffic, over a radio link, from a eNodeB to a UE is referred to as downlink (DL) traffic and traffic, over a radio link, from the UE to a eNodeB is referred to as uplink (UL) traffic. Note that in FIG. 1, the number of UEs and eNodeBs is only illustrative and the embodiments of the present invention are not restricted to any particular number of UEs and/or number of eNodeBs and/or number of cells per eNodeB.

Referring back to FIG. 1, it is here assumed that UE 111 and UE 113 are served by eNodeB 1 120. In other words it is assumed that UE 111 and UE 113 have already successfully random accessed the network 100 and are connected wirelessly to the eNodeB 1 120. Furthermore, it is also assumed for ease of understanding the principles of the embodiments of the present invention, that a eNodeB e.g. eNodeB 1 120 is serving one cell alone, although this is not necessary. In LTE, there are in total a set comprised of 64 random access preambles available per cell. Thus, a eNodeB can be assigned these 64 preambles. It should be noted that preambles assigned to different cells controlled by the same eNodeB do not necessarily belong to the same set of preambles i.e. different sets (and pools) are typically cell specific. However, for better understanding the different embodiments of the present invention, it is in here assumed that a eNodeB is serving a single cell and therefore, in this case, it is adequate to state that a set of 64 preambles are assigned by eNodeB (or per cell).

A first set within this set of 64 preambles, forms a pool of preambles for use with contention-based random access. The preambles of this pool are, as mentioned earlier, known as non-dedicated random access preambles. This pool is primarily used when there is UE-originated data and the UE has to establish a connection and/or an adequate uplink timing relation with the network through the random access (RA) procedure. When performing contention-based random access, the UE chooses/selects a non-dedicated random access preamble from this first set by random. For each non-dedicated random access preamble of this first set is associated a preamble identification number (or preamble identifier) called a RAPID (Random Access Preamble ID). Among the set of 64 preambles, there is also a second set forming a pool of dedicated random access preambles. A dedicated random access preamble of the second set is, as mentioned before, used to perform a contention-free random access. For contention-free random access, it is the eNodeB that assigns a dedicated random access preamble to the UE. In other words this type of random access is triggered by the network (e.g. the eNodeB). For contention-free random access, the eNodeB can therefore map the received preamble to the UE that has sent the random access preamble and has tried to access the system of network. Therefore, unlike for contention-based random access, no contention resolution procedure needs to be performed.

Referring back to FIG. 1, assume that, in respect of the UE 110, a contention-free random access procedure is triggered by the network (e.g. by the eNBode 1 120) so that that the UE can establish a time alignment and synchronization to the network (e.g. eNodeB). This is schematically illustrated using a dashed arrow between UE 110 and eNodeB 1 120. As mentioned earlier, the eNodeB 1 120 keeps track of all the dedicated random access preambles it has allocated and that are currently in use. Once a contention-free random access has successfully completed or the validity of the dedicated preamble allocation has expired, the dedicated preamble can be re-used. However, in the event that none of the dedicated random access preambles in the second set is for the moment available for allocation to the UE 110, the eNodeB, in accordance with prior art solution, does not know what to advice (or instruct) the UE 110 and thus the contention-free random access procedure have to be delayed until e.g. a dedicated random access preamble is available. However, according to embodiment of the present invention, as will be described below, the eNodeB 120 knows, if such an event occurs, what advice (instruction) to give to the UE 110.

In the event none of the dedicated random access preamble is available for allocation to the UE 110, the eNodeB 1 120, in accordance with an embodiment of the present invention, sends or transmits a message to the UE 110 and signals within that message a RAPID. The UE 110 then determines that the RAPID received in the message belongs to the first set. The UE 110 then selects based on said received RAPID, a non-dedicated random access preamble from the first set. The UE 110 can then perform a contention-based random access using the selected non-dedicated random access preamble, instead of performing a contention-free random access. As a consequence, the establishment of the time-alignment and synchronization is not unnecessarily delayed and the data latency is not unnecessarily increased.

According to an embodiment of the present invention, the eNodeB 1 120 signals the message comprising the RAPID to the UE 110, in a physical downlink control channel (PDCCH). According to another embodiment of the present invention, the eNodeB 1 120 signals the RAPID as part of a handover (HO) command message to the UE 110.

As mentioned above, the eNodeB 1 120 determines a RAPID which e.g. is associated with a non-dedicated random access preamble of the first set, when e.g. none of the dedicated random access preambles (for contention-free random access) of the second set is available for allocation to the UE 110. According to an embodiment of the present invention, the eNodeB 1 120 is configured/arranged to always select/use a fixed or pre-configured RAPID to signal a RAPID for contention-based access to the UE 110. As an example if the eNodeB 1 120 explicitly signals to the UE 110 a RAPID having a fixed ID value that is for example equal to 000000, then the UE 110 determines based on said RAPID that it belongs to the first set of preambles, and based on this, selects a non-dedicated random access preamble from this first set in order to perform a contention-based random access by transmitting the selected non-dedicated random access preamble.

According to another embodiment of the present invention, the eNodeB 1 120 is configured/arranged to randomly select a RAPID to signal contention-based access to the UE 110 by sending the RAPID in a message (PDCCH message or as part of a HO command message). Again, when the UE 110 receives the selected RAPID, it identifies that the RAPID belongs to the first set of preambles (or that it does not belong to the second set that forms the pool of dedicated random access preambles) and hence, that no dedicated preamble had been allocated to it and, consequently, the UE 110 knows that it should perform a contention-based random access instead of a contention-free random access. For that purpose, the UE 110 selects, based on the received RAPID, a non-dedicated random access preamble from the first set in order to perform a contention-based random access procedure.

According to an embodiment of the present invention, the UE 110 is configured/arranged to select a non-dedicated random access preamble from the second set, by directly selecting the non-dedicated random access preamble that is associated with the received RAPID.

According to another embodiment of the present invention, the UE 110 randomly selects a preamble from the first set of non-dedicated random access preambles, and uses it to perform a contention-based random access.

Figure 2:
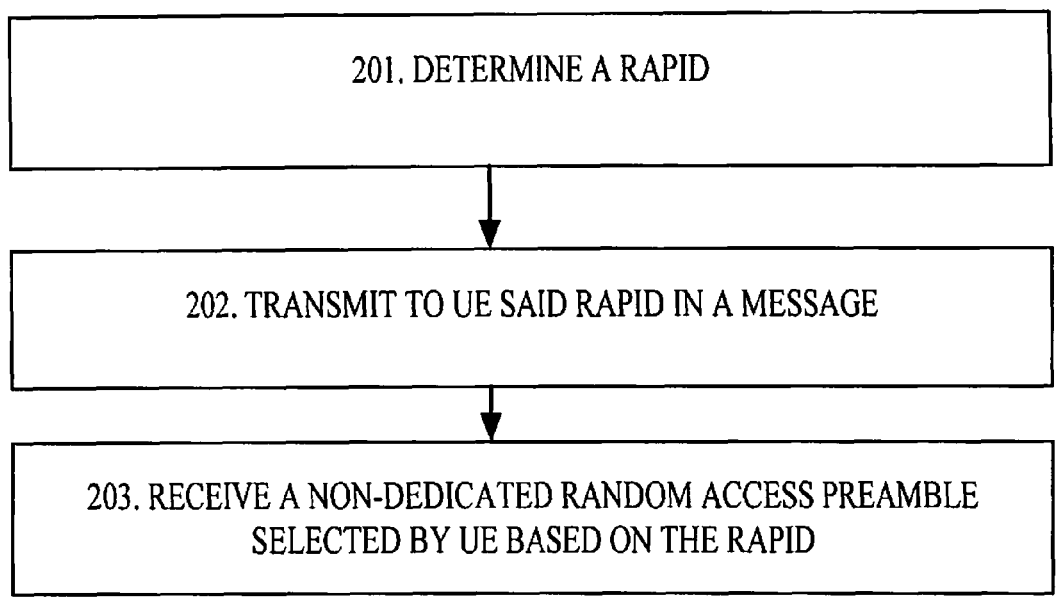
FIG. 2 is a diagram illustrating a flowchart of a method performed in a radio base station according to exemplary embodiments of the present invention.

Referring to FIG. 2 there is illustrated a flowchart of a method aimed to be performed/implemented in a radio base station (e.g. eNodeB), in accordance with the above described embodiments of the present invention. As mentioned earlier, the radio base station is assigned a first set forming a pool of non-dedicated random access preambles and a second set forming a pool of dedicated random access preambles. The method in the radio base station, enables a UE to perform a contention-based random access instead of a contention-free random access, due e.g. to that none of the dedicated random access preambles are available for allocation to said UE.

The method comprises the following main steps:
(201) determining a RAPID;
(202) transmitting a message (e.g. on a PDCCH or as part of a HO command message) to the UE, the message indicating the RAPID; and
(203) receiving from the UE a non-dedicated random access preamble that is selected by the UE based on the received RAPID.

As mentioned before the radio base station (or eNodeB) can use a pre-configured RAPID that is explicitly signalled/transmitted in said message in order to indicate to the UE that a contention-based random access is to be performed. As an example, the radio base station can explicitly signal in said message to the UE a pre-configured RAPID value which is equal to e.g. 000000. The radio base station (or eNodeB) can also randomly select a RAPID and explicitly signals the randomly chosen RAPID in a message to the UE. It should be mentioned that the radio base station (e.g. eNodeB) is not restricted to the above described solution on how to identify/detect that none of the dedicated random access preambles is available for allocation.

Figure 3:
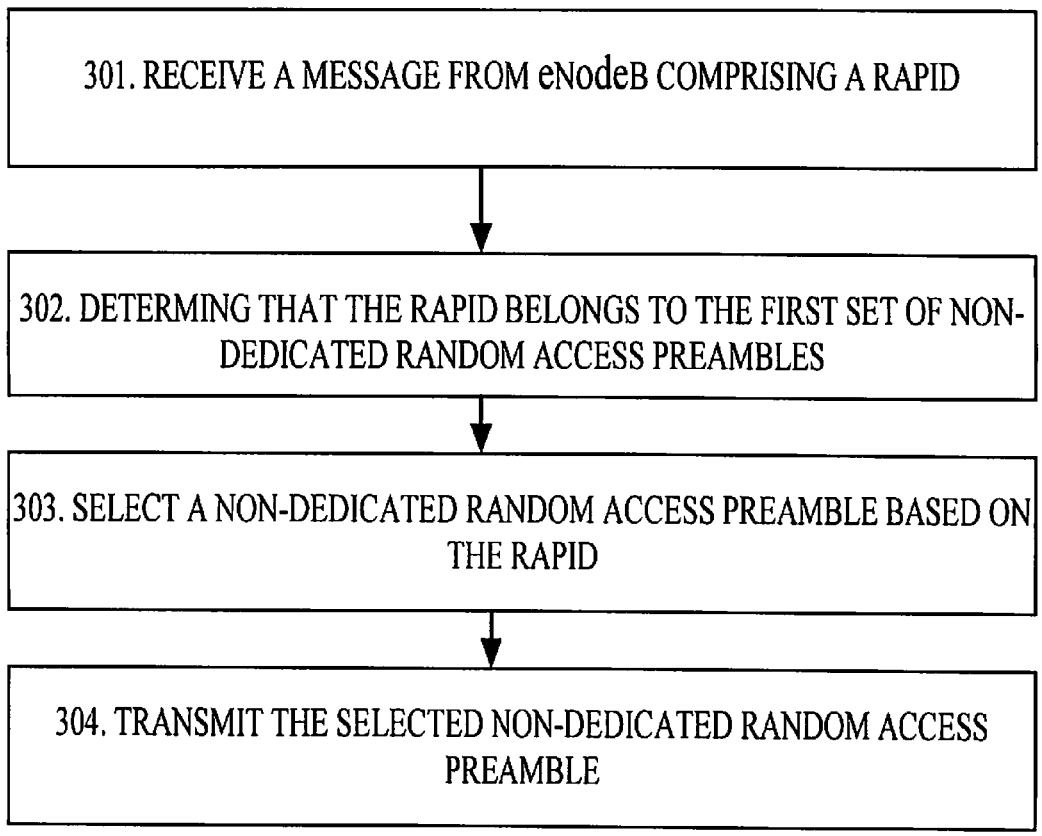
FIG. 3 is a diagram illustrating a flowchart of a method performed in a user equipment according to exemplary embodiments of the present invention.

Referring to FIG. 3 there is illustrated a flowchart of a method aimed to be performed/implemented in a UE, in accordance with the previously described embodiments of the present invention. The method in the UE, enables said UE to perform a contention-based random access instead of a contention-free random access, due e.g. to that none of the dedicated random access preambles are available for allocation to said UE.

The method comprises the following main steps:
(301) receiving a message from the radio base station (or eNodeB), said message (on the PDCCH or as part of a HO command message) comprises a RAPID;
(302) determining that the RAPID belongs to the first set of non-dedicated random access preambles;
(303) selecting a non-dedicated random access preamble based on the received RAPID; and
(304) transmitting the selected non-dedicated random access preamble to the radio base station in order to perform a contention-based random access using the selected preamble.

As mentioned earlier the UE can select a non-dedicated random access preamble that is directly associated with the received RAPID. The UE can also randomly select a non-dedicated random access preamble from the first set of preambles.

Figure 4:
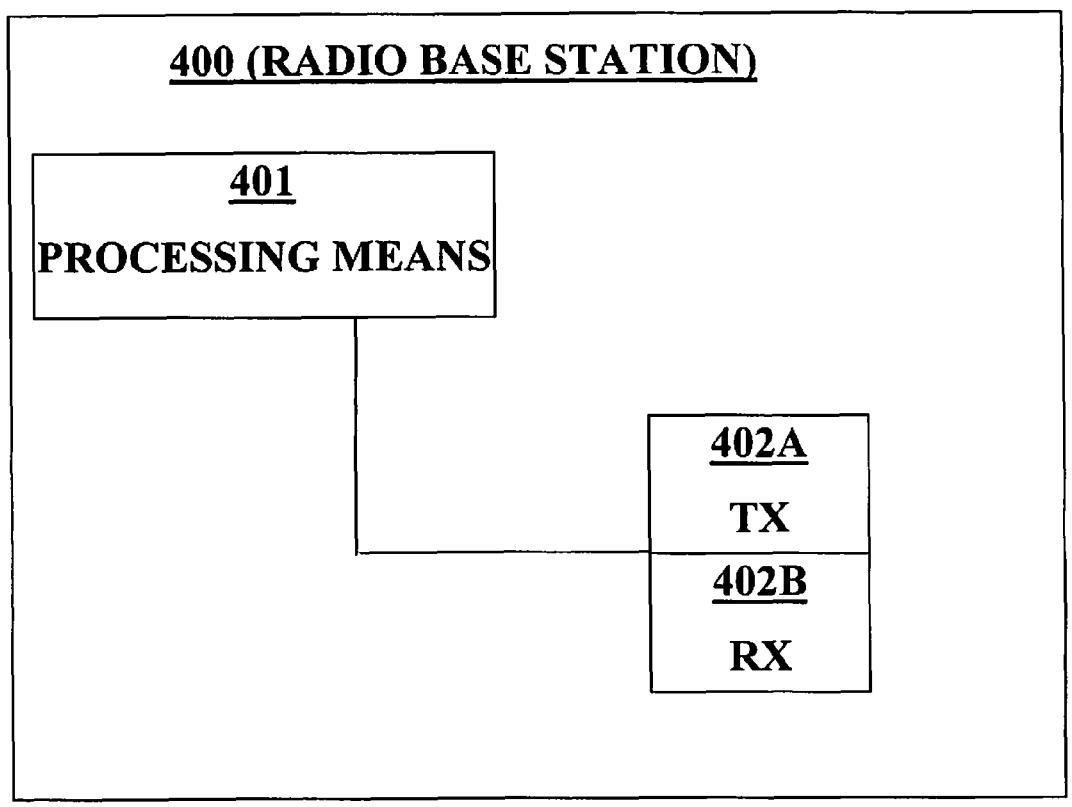
FIG. 4 illustrates a block diagram of an exemplary radio base station according to embodiments of the present invention.

Referring to FIG. 4 there is illustrated a block diagram of an exemplary radio base station 400 (e.g. eNodeB) being configured/arranged to enable a UE to perform a contention-based random access. The radio base station 400 is assigned a first set forming a pool of non-dedicated random access preambles and a second set forming a pool of dedicated random access preambles. As shown in FIG. 4, the radio base station 400 comprises processing means 401 adapted to determine a RAPID. As an example, the processing means 401 can identify that no dedicated random access preambles can be allocated to the UE and can then determine the RAPID. The radio base station 400 further comprises transmitting means 402A, denoted TX in FIG. 4, which is adapted/configured to transmit or send the determined RAPID to said UE in a message (i.e. on the PDCCH or as part of a HO command message). The radio base station 400 further comprises receiving means 402B, denoted RX in FIG. 4, which is arranged/configured to receive, from the UE, a non-dedicated random access preamble that is selected by the UE based on the received RAPID. As previously described, the radio base station is adapted to determine a RAPID by selecting a pre-configured RAPID. The radio base station may also randomly select a RAPID. Additional actions performed by the radio base station have already been described and are therefore not repeated. It should however be mentioned that the different exemplary blocks shown in FIG. 4 are not necessarily separated. Furthermore the TX means 402A and the RX means 402B are not necessarily included in the same block i.e. they each can be represented by a single block. The radio base station 400 is therefore not restricted and is not limited to the exemplary block diagram shown in FIG. 4. In addition, the radio base station 400 may also comprise other element and/or blocks not illustrated in FIG. 4.

Figure 5:
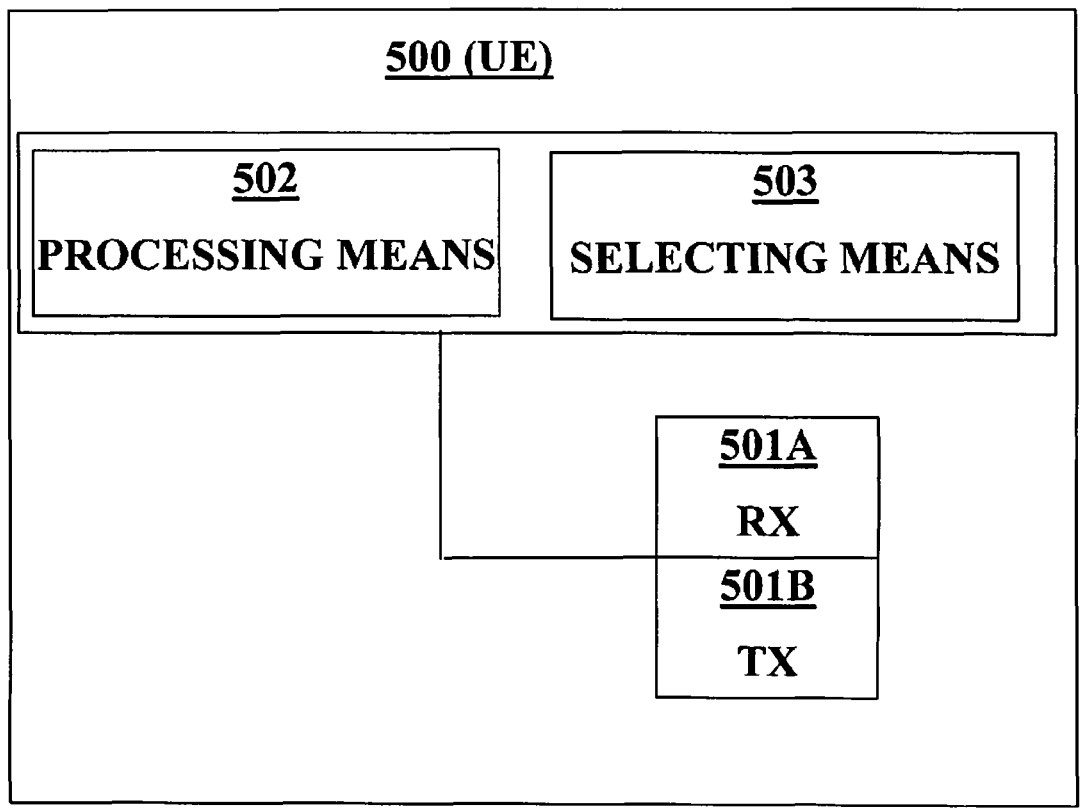
FIG. 5 illustrates a block diagram of an exemplary user equipment according to embodiments of the present invention.

Referring to FIG. 5 there is illustrated a block diagram of an exemplary user equipment UE 500 capable in performing a contention-based random access, in accordance with previously described embodiments of the present invention. As shown in FIG. 5, the UE 500 comprises receiving means 501A, denoted RX in FIG. 5, which is adapted/configured to receive from a radio base station a message comprising a RAPID. As a non-limiting example, the message (e.g. on the PDCCH or as part of a HO command message) can be received due to that none of the dedicated random access preambles (of the second set) is available for allocation as previously described. The UE 500 further comprises processing means 502 configured/adapted to determine that the received RAPID belongs to the first set. The UE 500 further comprises selecting means 503 (which can be part, but not necessarily, of the processing means 502) which is adapted/configured to select based on the received RAPID, a non-dedicated random access preamble. The UE 500 further comprises transmitting means 501B, denoted RX in FIG. 5, which is adapted/configured to transmit to said radio base station the selected non-dedicated random access preamble in order to perform a contention-based random access. It should be mentioned that the processing means 502 may also be adapted to perform the contention-based random access in cooperation with TX means 501B. As mentioned earlier, the UE can select a non-dedicated random access preamble by directly selecting a non-dedicated random access preamble that is associated with the RAPID. The UE can also randomly select a preamble as previously described.

It should be noted that it is expected that e.g. LTE systems will be deployed in a wide range of scenarios, from pico cells to very large cells of up to 100 km and beyond. Since the random access is the first procedure performed by a UE to access a network it is very important that the random access procedure works well in all anticipated scenarios even in a exemplary scenario when none of the dedicated random access preamble is available for allocation to a UE. The previously described exemplary embodiments of the present invention thus successfully deal with at least such problem scenario. It should be mentioned that in previously described exemplary embodiments of the present invention, by none of the dedicated random access preambles is available for allocation, is also meant, no dedicated random access preamble is available for allocation.

The present invention and its embodiments can be realized in many ways. For example, one embodiment of the present invention includes a computer-readable medium having instructions stored thereon that are executable by a radio base station (e.g. eNodeB or eNB) and/or a UE of a telecommunications system. The instructions executable by the radio base station and/or the UE and stored on a computer-readable medium perform the method steps of the present invention as set forth in the claims.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention.

What is claimed is:

1. A method of enabling a user equipment to perform random access in a telecommunications system comprising a radio base station to which are assigned a first set of non-dedicated random access preambles and a second set of dedicated random access preambles, the method comprising:
   receiving, from a radio base station, a message containing a random access preamble identifier;
   determining whether the random access preamble identifier received in the message comprises a predetermined identifier associated with non-dedicated random access preambles;
   if the random access preamble identifier received in the message comprises the predetermined identifier associated with non-dedicated random access preambles, randomly selecting a non-dedicated random access preamble and performing a contention-based random access procedure using the randomly-selected non-dedicated random access preamble; and
   if the random access preamble identifier received in the message does not comprise the predetermined identifier associated with non-dedicated random access preambles, performing a contention-free random access procedure using a dedicated preamble identified by the random access preamble identifier received in the message.

2. The method of claim 1, wherein determining whether the received random access preamble identifier comprises a predetermined identifier associated with non-dedicated random access preambles comprises determining whether the received random access preamble identifier equals a predetermined value.

3. The method of claim 2, wherein determining whether the received random access preamble identifier equals a predetermined value comprises determining whether the received random access preamble identifier is equal to "000000."

4. The method of claim 1, wherein randomly selecting the non-dedicated random access preamble comprises randomly selecting a non-dedicated random access preamble from a first set of random access preambles assigned to the base station for use by user equipment served by the base station when no dedicated random access preambles are available.

5. The method of claim 4, wherein performing a contention-free random access procedure comprises identifying a dedicated random access preamble from a second set of random access preambles associated with the received random access preamble identifier, wherein the second set of random access preambles comprises random access preambles assigned to the base station for exclusive use by a particular user equipment served by the base station.

6. The method of claim 1, wherein receiving a message containing a random access preamble identifier comprises receiving a message containing the random access preamble identifier on a physical downlink control channel.

7. The method of claim 1, wherein receiving a message containing a random access preamble identifier comprises receiving the random access preamble identifier in a handover command message.

8. The method of claim 1, wherein performing a contention-based random access procedure comprises transmitting a random access message containing the randomly-selected random access preamble to the base station.

9. A method of enabling a user equipment to perform a random access in a telecommunications system, the method comprising:
    receiving, from a radio base station, a message containing a random access preamble identifier;
    identifying the received random access preamble identifier as being a non-dedicated preamble identifier or a dedicated random access preamble identifier;
    if the received random access preamble identifier is a non-dedicated random access preamble identifier, randomly selecting a non-dedicated random access preamble and performing a contention-based random access procedure using the randomly-selected non-dedicated random access preamble; and
    if the received random access preamble identifier is a dedicated random access preamble, performing a contention-free random access procedure using a dedicated preamble identified by the received random access preamble identifier.

10. The method of claim 9, wherein identifying the received random access preamble identifier as being a non-dedicated preamble identifier or a dedicated random access preamble identifier comprises determining whether or not the received random access preamble identifier equals one of one or more predetermined values associated with non-dedicated random access preambles.

11. The method of claim 10, wherein determining whether the received random access preamble identifier equals one of one or more predetermined values comprises determining whether the received random access preamble identifier is equal to "000000."

12. The method of claim 9, wherein randomly selecting the non-dedicated random access preamble comprises randomly selecting a non-dedicated random access preamble from a first set of random access preambles assigned to the base station for use by user equipment served by the base station when no dedicated random access preambles are available.

13. The method of claim 12, wherein performing a contention-free random access procedure comprises identifying a dedicated random access preamble from a second set of random access preambles associated with the received random access preamble identifier, wherein the second set of random access preambles comprises random access preambles assigned to the base station for exclusive use by a particular user equipment served by the base station.

14. The method of claim 9, wherein receiving a message containing a random access preamble identifier comprises receiving a message containing the random access preamble identifier on a physical downlink control channel.

15. The method of claim 9, wherein receiving a message containing a random access preamble identifier comprises receiving the random access preamble identifier in a handover command message.

16. The method of claim 1, wherein performing a contention-based random access procedure comprises transmitting a random access message containing the randomly-selected random access preamble to the base station.

17. An apparatus for wireless communication, the apparatus comprising:
    a receiver configured to receive a message from a radio base station, the message containing a random access preamble identifier; and
    a processor configured to:
        determine whether the random access preamble identifier received in the message comprises a predetermined identifier associated with non-dedicated random access preambles;
        if the random access preamble identifier received in the message comprises the predetermined identifier associated with non-dedicated random access preambles, randomly select a non-dedicated random access preamble and perform a contention-based random access procedure using the randomly-selected non-dedicated random access preamble; and
        if the random access preamble identifier received in the message does not comprise the predetermined identifier associated with non-dedicated random access preambles, perform a contention-free random access procedure using a dedicated preamble identified by the random access preamble identifier received in the message.

18. The apparatus of claim 17, wherein the processor is configured to determine whether the received random access preamble identifier comprises a predetermined identifier associated with non-dedicated random access preambles by determining whether the received random access preamble identifier equals a predetermined value.

19. The apparatus of claim 18, wherein the processor is configured to determine whether the received random access preamble identifier equals a predetermined value by determining whether the received random access preamble identifier is equal to "000000."

20. The apparatus of claim 17, wherein the processor is configured to randomly select the non-dedicated random access preamble by randomly selecting a non-dedicated random access preamble from a first set of random access preambles assigned to the base station for use by user equipment served by the base station when no dedicated random access preambles are available.

21. The apparatus of claim 20, wherein the processor is configured to perform a contention-free random access procedure by identifying a dedicated random access preamble from a second set of random access preambles associated with the received random access preamble identifier, wherein the second set of random access preambles comprises random access preambles assigned to the base station for exclusive use by a particular user equipment served by the base station.

22. The apparatus of claim 17, wherein the receiver is configured to receive a message containing a random access preamble identifier by receiving a message containing the random access preamble identifier on a physical downlink control channel.

23. The apparatus of claim 17, wherein the receiver is configured to receive a message containing a random access preamble identifier by receiving the random access preamble identifier in a handover command message.

24. The apparatus of claim 17, wherein the processor is configured to perform a contention-based random access procedure by transmitting a random access message containing the randomly-selected random access preamble to the base station.

25. An apparatus for wireless communication, the apparatus comprising:
- a receiver configured to receive a message from a radio base station, the message containing a random access preamble identifier; and
- a processor configured to:
    - identify the received random access preamble identifier as being a non-dedicated preamble identifier or a dedicated random access preamble identifier;
    - if the received random access preamble identifier is a non-dedicated random access preamble identifier, randomly select a non-dedicated random access preamble and perform a contention-based random access procedure using the randomly-selected non-dedicated random access preamble; and
    - if the received random access preamble identifier is a dedicated random access preamble, perform a contention-free random access procedure using a dedicated preamble identified by the received random access preamble identifier.

26. The apparatus of claim 25, wherein the processor is configured to identify the received random access preamble identifier as being a non-dedicated preamble identifier or a dedicated random access preamble identifier by determining whether or not the received random access preamble identifier equals one of one or more predetermined values associated with non-dedicated random access preambles.

27. The apparatus of claim 26, wherein the processor is configured to determine whether the received random access preamble identifier equals one of one or more predetermined values by determining whether the received random access preamble identifier is equal to "000000."

28. The apparatus of claim 25, wherein the processor is configured to randomly select the non-dedicated random access preamble by randomly selecting a non-dedicated random access preamble from a first set of random access preambles assigned to the base station for use by user equipment served by the base station when no dedicated random access preambles are available.

29. The apparatus of claim 28, wherein the processor is configured to perform a contention-free random access procedure by identifying a dedicated random access preamble from a second set of random access preambles associated with the received random access preamble identifier, wherein the second set of random access preambles comprises random access preambles assigned to the base station for exclusive use by a particular user equipment served by the base station.

30. The apparatus of claim 25, wherein the receiver is configured to receive a message containing a random access preamble identifier by receiving a message containing the random access preamble identifier on a physical downlink control channel.

31. The apparatus of claim 25, wherein the receiver is configured to receive a message containing a random access preamble identifier by receiving the random access preamble identifier in a handover command message.

32. The apparatus of claim 25, wherein the processor is configured to perform a contention-based random access procedure by transmitting a random access message containing the randomly-selected random access preamble to the base station.

* * * * *